United States Patent [19]

Starr

[11] 4,400,194
[45] Aug. 23, 1983

[54] METHOD AND APPARATUS FOR PRODUCING HEAT-STRENGTHENED GLASS SHEETS HAVING IMPROVED BREAK PATTERNS

[75] Inventor: Eugene W. Starr, Allison Park, Pa.
[73] Assignee: PPG Industries, Inc., Pittsburgh, Pa.
[21] Appl. No.: 347,668
[22] Filed: Feb. 10, 1982
[51] Int. Cl.³ .............................................. C03B 27/04
[52] U.S. Cl. ...................................... 65/114; 65/115; 65/348; 65/351
[58] Field of Search .................. 65/115, 114, 348, 351

[56] References Cited
U.S. PATENT DOCUMENTS

| | | | |
|---|---|---|---|
| 2,093,040 | 9/1937 | Eckert . | |
| 2,188,401 | 1/1940 | Crowley . | |
| 3,251,670 | 5/1966 | Acloque | 65/115 |
| 3,304,166 | 2/1967 | Bolland | 65/273 |
| 3,363,936 | 1/1968 | Baker | 296/84 |
| 3,364,006 | 1/1968 | Newell et al. | 65/348 |
| 3,396,001 | 8/1968 | Baker | 65/115 |
| 3,847,580 | 11/1974 | Misson | 65/25 A |
| 4,236,909 | 12/1980 | Thomas et al. | 65/115 |

Primary Examiner—Arthur D. Kellogg
Attorney, Agent, or Firm—Donald Carl Lepiane; Edward I. Mates

[57] ABSTRACT

Heat strengthened glass is treated to have a break pattern that permits the fractured glass sheet to be retained within an installation frame by moving a glass sheet through a heating area, force cooling the side portions of the moving sheet while cooling the intermediate portions of the sheet at a lesser rate to establish a temperature gradient between the side portions and the intermediate portion, and subsequently applying quenching medium to the entire moving sheet. The temperature gradient in the sheet is achieved by a plurality of baffles, e.g. plates having an imperforate center portion and apertured or slotted end portions and facilities movable relative to quenching nozzles to control passage of quenching medium through the slotted end portions of the baffles to control the temperature gradient imparted to the glass sheet. The movable facilities also permit tempering of glass sheets of varying transverse dimensions.

20 Claims, 7 Drawing Figures

BREAK PATTERN DEVELOPED BY PRIOR ART METHOD

METHOD AND APPARATUS FOR PRODUCING HEAT-STRENGTHENED GLASS SHEETS HAVING IMPROVED BREAK PATTERNS

BACKGROUND OF THE INVENTION

1. Field of the Invention

The present invention relates to the thermal treatment of glass sheets. More specifically, it relates to the heat strengthening of glass sheets used in large window openings where it is important that the glass have suitable break patterns that prevent the glass from forming islands within the supported marginal periphery when the window fractures. These islands fall from the main body of the glass when the glass is fractured and are dangerous to people passing by a building containing such windows, especially when the windows are installed in an upper floor of a skyscraper.

When glass sheets are either tempered or heat strengthened to a partial temper by conventional techniques of heating the glass to above its strain point to attain a temperature sufficient for tempering followed by cooling the glass at a controlled rate of cooling, or when the glass sheets are heat treated by heating the glass sheets to a temperature sufficient for tempering followed by natural cooling, typical break patterns sometimes occur having particles in the form of islands that separate from the main body of the glass sheet when the sheet is fractured. The size of the particles or islands that are formed is dependent upon the degree of temper developed in the glass. Generally, large particles are associated with glass sheets that are heat strengthened to a relatively low temper and the size of the particles in general become smaller as the temper in the glass becomes greater.

It is well known that when glass sheets are subjected to a thermal treatment consisting of heating followed by rapid cooling, that the glass sheets develop a temper. The degree of the temper depends upon the elevated temperature to which the glass sheets are heated and the rate of cooling from the elevated temperature to below the strain point of the glass. Tempered glass sheets develop a compression stress zone in their edge and surface portions that surround an interior portion stressed in tension. Since glass is extremely strong in compression and extremely weak in tension, as long as any mechanical or other force applied to the tempered glass is insufficient to overcome the compressive stress at its surface or edge portion, tempered glass resists breakage. However, when tempered glass sheets fracture, they form relatively small particles that separate readily from a frame in which the window is installed in a building. Fragments dropping onto a pavement below the window are dangerous to passersby.

Uncontrolled tempering of glass sometimes causes glass warpage which results in mechanical stress during and after installation. Inducing a partial temper by controlling heating and/or cooling has been used to develop windows that are warped a minimum amount so that they can be installed without excessive stresses within a window frame. However, under some circumstances, certain heat strengthened glass sheets provided with a limited degree of temper have fractured in the past, and the resulting break pattern provided at least one large piece in the form of an island that fell out of the remainder of the window installed within an installation frame.

When fabricating windows for skyscrapers, considerable breakage has occurred. Glass sheets have been heat strengthened in an attempt to both minimize warpage and provide sufficient temper to enable the window to resist fracture under most conditions encountered during handling and usage. However, when heat-strengthened windows break due to stresses resulting from mechanical or heat forces applied locally to portions thereof, such windows develop a break pattern. Under certain conditions, the break pattern provides a line of breakage that is almost continuous to form one or more discrete areas inward from the frame that supports the window by engaging its marginal portion. Large pieces of glass within said frame sometimes separate from the window and fall onto the sidewalk below.

Attempts to develop a better break pattern that does not result in a break line enclosing a discrete area spaced inward from the installation frame have been successful prior to the present invention only with heat strengthened glass sheets that have a much lower stress pattern than tempered glass. A suggested method of producing a lower stress pattern involves a slower rate of forced cooling, even to the point of letting the glass cool naturally or at a restricted rate of cooling. It has been found that under some conditions not yet identified, such naturally cooled glass also develops a break pattern that includes a break line surrounding a discrete area or island of rather large dimensions that tends to break away from the remainder of the glass sheet. Reducing the rate of applying cold air to the opposite surfaces of the heated glass sheets reduces the stress in the glass but, because the residual compression stress reduction is insufficient, fails to avoid more frequent breakage associated with lesser residual compression stresses that were characteristic of glass sheets having an acceptable break pattern.

Prior to the present invention, a need existed for a window which had a higher residual edge compression stress coupled with a more uniform residual surface compression stress so that the window would be less likely to break and, if broken, would be retained within an installation frame. A need also existed for an improved method for making a window having a break pattern that insured the likelihood of such an event that would avoid the dropping of large pieces from windows onto pedestrians below a building in which the window is installed. Generally, glass sheets were rendered less susceptible to thermal breakage and to edge damage during handling and installation by imparting a high residual compression edge stress to the glass. However, glass sheets thermally treated to have a high residual compression edge stress also had a steep gradient of residual surface compression stress throughout the extent of the glass sheets. The prior art did not fully appreciate how to avoid the steep gradient of residual surface compression stress while developing a higher residual surface compression stress in the glass.

A method was developed to cool glass sheets from the elevated temperature associated with tempering in such a manner that as the glass sheets passed through the cooling station of heat strengthening apparatus, a more uniform residual surface compression stress pattern resulted in the interior portion of the glass sheet surrounded by its edge. However, the techniques developed prior to the present invention failed to develop surface compression stresses over the major surface of the glass that meets the minimum standards of surface compression stress established in Federal Specification DD-G-1403B.

2. Description of the Prior Art

U.S. Pat. No. 2,093,040 to Eckert teaches a two step method of tempering glass sheets in which the glass sheets are initially chilled as rapidly as possible to a temperature which lies at or near or somewhat below the annealing temperature of the glass, i.e., that temperature below which temporary stresses are mainly developed. According to this patent, further cooling is accomplished at a slower rate, but one that is still more rapid than a natural cooling rate in an open air environment.

U.S. Pat. No. 2,188,401 to Crowley discloses apparatus for tempering glass sheets in which a plurality of rotatable shutters are interposed between upper and lower sets of nozzles to insure that the entire length of a glass sheet is cooled from the same instant at the beginning of a cooling step as all other portions of the sheet so as to minimize the danger of warpage or breakage of the sheet during its fabrication.

U.S. Pat. No. 3,251,670 to Acloque interposes a disc or a donut-shaped member between tempering nozzles and a portion of the glass sheet to be provided with less temper than the remainder of the sheet in a technique for differentially tempering glass sheets. Other patents showing deflectors or angle bars interposed between a source of pressurized air and the opposite major surfaces of a glass sheet to be differentially tempered inclusde U.S. Pat. Nos. 3,363,936 and 3,396,001 to Baker and U.S. Pat. No. 3,364,006 to Newell et al.

Furthermore, U.S. Pat. No. 3,304,166 to Bolland discloses the use of screens for reducing the rate of flow from high pressure air blasting members against a localized portion of a glass sheet to be tempered to a lower stress than the remainder of the sheet during differential tempering.

U.S. Pat. No. 3,847,580 to Misson discloses a two step cooling method for tempering glass sheets while supported on a gaseous hearth. During the first step, the glass is supported and chilled rapidly until both its center plane temperature and its surface temperature is reduced below the strain point of the glass. During the second step, the glass is supported and cooled by relatively lower volumetric flows of cooling gas per unit of surface support area to maintain the temper initially imparted during the first step. The total power consumption for this two stage tempering process is less than that required for conventional tempering in which the high rate of cooling is maintained throughout cooling.

U.S. Pat. No. 4,236,909 to Thomas, Frank and Claassen obtains an improvement in the break patterns developed by a technique in which the glass sheets, after heating to an elevated temperature sufficient for tempering, are initially force cooled at a rate sufficient to develop a temperature gradient from its major surfaces to the center of its thickness that is steeper than the temperature gradient produced by natural cooling, and before the glass sheet cools to the strain point at the center of its thickness, discontinuing the force cooling and retarding the rate of glass sheet cooling at the major surfaces to a rate less than the rate of cooling the edge surfaces of the glass sheet by supporting the glass sheet immediately after the force cooling with its major surface facing continuous walls closely spaced relative to the major surfaces of the glass sheet while the edge surfaces face the space between the walls until the sheet develops a more uniform surface compression stress pattern over the entire extent of the glass sheet within an edge portion that is relatively highly stressed in compression. This technique was used in an attempt to obtain higher residual surface compression stresses. The break pattern that developed at higher surface compression stresses was insufficient to provide the safety factor that was obtained at the lower residual surface compression stresses obtained with this technique for glass sheets heat strengthened to a lower degree of temper.

SUMMARY OF THE INVENTION

The present invention provides a method and apparatus for obtaining a desirable break pattern of heat treated glass sheets which meets the requirement of surface and edge compression stress defined by Federal Specification DD-G-1403B. The technique is particularly suitable for glass sheets installed in window openings ranging from dimensions on the order of 24 inches (60 centimeters) to more than eight feet (244 centimeters).

According to the present invention, glass sheets are arranged in a series and heated to the temperature required for tempering, and after a short interval of natural cooling as the glass travels from the exit of a furnace into a cooling station, the side edge portions of the moving glass sheet are selectively force cooled while the central portion of the sheet intermediate the side edge portions are subject to a more moderate cooling. The leading and trailing edge portions of adjacent glass sheets in the series are spaced from one another a sufficient distance so that said leading and trailing edge portions naturally cool at a faster rate than the main body of the glass sheet during this movement through the upstream portion of the cooling station. After a predetermined time interval of differentially cooling the glass sheet across its dimension transverse to its path of travel, the entire glass sheet is exposed to the flow of cold tempering medium applied against the opposite major surfaces. The resulting stress pattern in the glass develops a large enough residual edge compression stress exceeding 5500 pounds per square inch (387 kilograms per square centimeter), and a residual surface compression stress greater than 3500 pounds per square inch (246 kilograms per square centimeter) and not greater than 10,000 pounds per square inch (703 kilograms per square centimeter). As a result, the glass sheets meet the requirements of surface and edge compression stress combinations required to conform to the federal specification previously mentioned.

Apparatus for performing the method of the present invention comprises a conveyor comprising a plurality of longitudinally spaced, transversely extending conveyor rolls extending from the exit of a furnace through a quenching station along a path between upper and lower sets of nozzle boxes that extend transverse to the path defined by the conveyor. The nozzle boxes in an upstream portion of the quenching station have movable baffle means constructed and arranged to be supported intermediate the ends of the nozzles facing the path of travel taken by the main portion of the glass sheets through the quenching station. The baffle means are constructed and arranged to provide free flow of cold quenching medium toward the opposite transverse side edge portions of the moving glass sheets as they move between the upper and lower nozzle boxes with the baffle means interposed between the nozzles facing the main portion of the major surfaces of the moving glass sheets but not those facing the side edge portions of the glass sheet. Downstream of the nozzle boxes containing baffle means are additional nozzle boxes provided with nozzles that extend toward the path of glass sheet movement. These downstream nozzle boxes are free of baffle means so as to permit unimpeded flow of cold quenching medium from the nozzles toward the opposite major surfaces of the glass sheets throughout their extent. The number of nozzle boxes provided is more than that needed for heat strengthening thicker sheets. Thus, it is possible to heat strengthen thinner glass sheets by using additional nozzle boxes not needed to heat strengthen thicker glass sheets.

It has been found that the method and apparatus of the present invention result in glass sheets having the break pattern desired. Whenever a glass sheet that is installed shows a crack, it can be replaced before the observed crack develops into an undersirable break pattern. In the past, when attempts were made to develop sufficiently large residual surface compression stress to minimize the danger of breakage, the break pattern would develop one or more islands so rapidly that there was insufficient time to replace the window before the break pattern developed its undesirable characteristic. The present invention provides the feature of slower development of break pattern even though the window has a higher overall residual stress pattern that complies with the federal specifications that now must be met.

At the same time, the residual edge compression stresses have been improved significantly to enable the glass sheets to be handled during installations and shipping with relatively little fear of edge breakage. The installed glass sheets resulting from the method of and fabricated using apparatus conforming to the present invention also have a high level of residual surface compression stress to reduce the frequency of breakage and a sufficient uniformity of residual surface compression stress throughout the extent of the window inside its installation frame so as to insure an acceptable break pattern.

During and after installation, the installed glass sheet develops surface flaws under thermal or wind load conditions that tend to grow into break patterns. A large portion of these surface flaws that would develop into lines of breakage that formed islands that fall away from the main body of windows made using the prior art technique at more rapid cooling rates to develop larger residual surface compression stress do not develop the islands characteristic of unacceptable break patterns in windows conforming to the aforesaid federal specifications when the glass sheets are fabricated using the apparatus and performing the method steps of the present invention.

The benefits of the present invention will be understood more clearly in the light of a description of a preferred embodiment that follows.

BRIEF DESCRIPTION OF THE DRAWINGS

In the drawings that form part of the description of an illustrative embodiment.

DESCRIPTION OF THE PREFERRED EMBODIMENT

Figure 1:
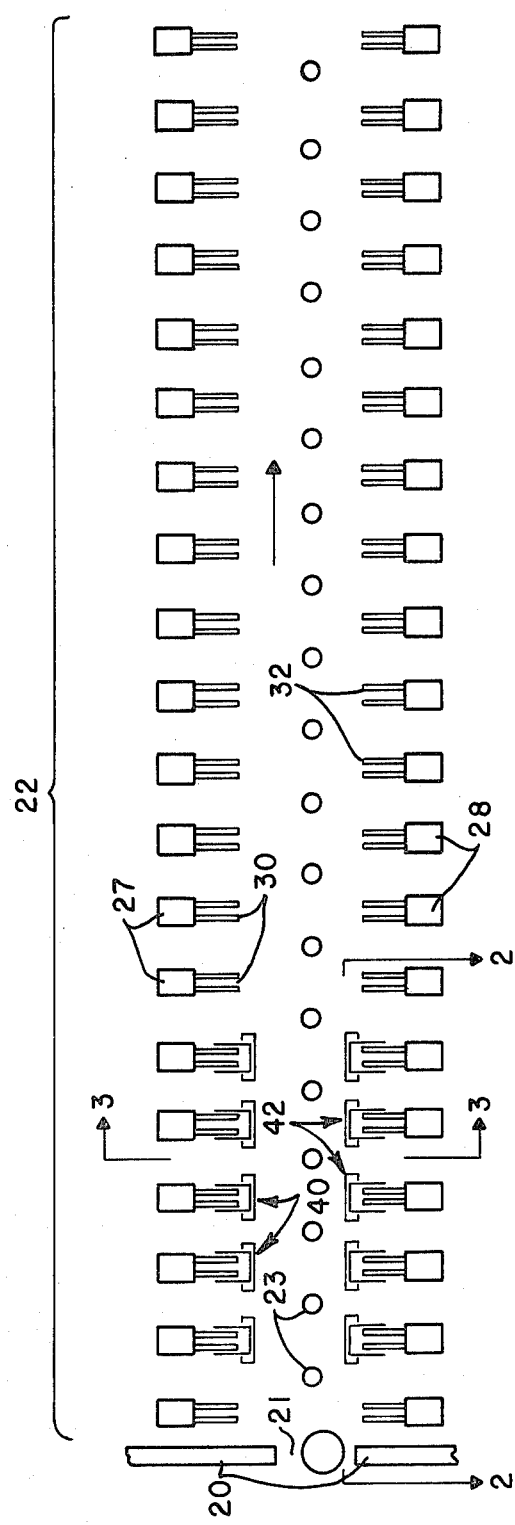
FIG. 1 is a schematic longitudinal side view of quenching apparatus modified according to the present invention.

Referring to the drawings, and particularly FIG. 1, the apparatus for heat strengthening glass sheets and developing the desired residual compression stress pattern comprises a tunnel-like furnace 20 having an exit opening 21 and a quenching station 22 disposed in end to end relation. A roller conveyor is provided comprising transversely extending longitudinally spaced conveyor rolls 23 that are located throughout the length of the furnace 20 and the quenching station 22 and beyond to define a path of travel to an unloading station (not shown) where glass sheets are removed after they are cooled to handling temperature.

The conveyor rolls define a generally horizontal path of travel for the glass sheet from its upstream end at the entrance to the furnace 20 to its downstream end beyond the quenching station 22. The furnace 20 is provided with heating elements above and below the path of travel and oriented to face said path of travel. The speed of glass sheet movement through the furnace is correlated with the furnace length to enable the glass sheets to reach the furnace exit at an elevated temperature suitable for heat strengthening or tempering.

The quenching station 22 comprises upper nozzle boxes 27 and lower nozzle boxes 28. Each nozzle box 27 and 28 extends transversely and is longitudinally spaced from its neighbors. Each upper nozzle box is provided with a plurality of transverse rows of upper nozzles 30 (two rows being shown, but more rows may be provided if so designed) extending downward toward the path of glass movement defined by the conveyor rolls 23. Additional lower nozzles 32 extend upward from the lower nozzle boxes 28.

The upper nozzle boxes extend transversely above the path of travel taken by glass sheets and the lower nozzle boxes extend transversely below the path of travel for the glass sheets and oppose the corresponding upper nozzle boxes 27. The nozzle boxes are fed quenching medium such as air under pressure from one or more suitable pressurized air sources (not shown) through pressure regulating devices (also not shown) in a manner well known in the art.

The apparatus described thus far represents a conventional glass sheet treatment apparatus designed for heat treating glass sheets. When used in its conventional manner, a series of glass sheets is conveyed through the furnace 20 where each sheet in turn is heated to a temperature sufficiently high for tempering and the glass sheet is then quenched with streams of cold air applied downwardly through the upper nozzles 30 against the upper major surfaces of the glass sheets and upwardly through the lower nozzles 32 against the lower major surfaces of the glass sheets. The upper nozzles 30 are aligned with corresponding lower nozzles 32 and the lower nozzles 32 are disposed in spaced relation to direct quenching medium through the spaces between adjacent conveyor rolls 23.

Figure 3:
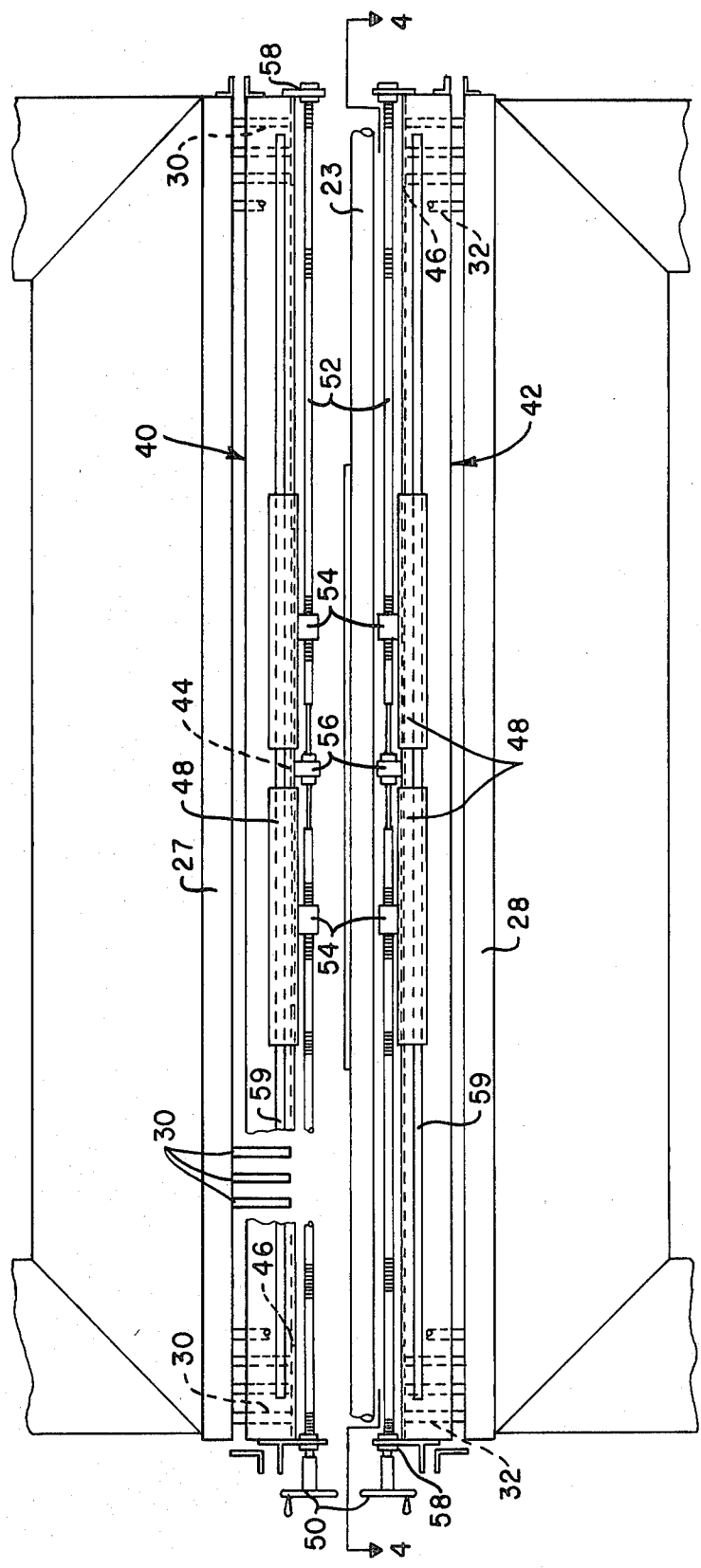
FIG. 3 is a transverse elevational sectional view along the line 3—3 of FIG. 1.
Figure 4:
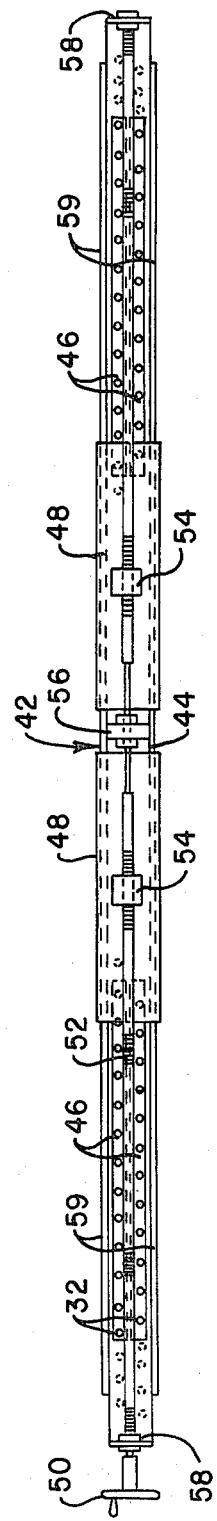
FIG. 4 is a plan view taken along line 4—4 of FIG. 3.

According to one embodiment of the present invention, upper baffle means 40 are supported in the upstream portion of the quenching station 22 adjacent the openings of certain upper nozzles 30 and intermediate said certain upper nozzles 30 and the upper major surface of any glass sheet that passes through the quenching station. In addition, the apparatus is further modified by lower baffle means 42 extending transversely of the quenching station 22 in aligned relation below the upper baffle means 40. Each of the baffle means 40 and 42 comprises a metal plate having an imperforate portion 44 (see FIG. 3) facing the transverse center portion of the path of travel taken by the glass sheets and an apertured side portion comprising transversely extending elongated slots 46 beyond each transverse end of said imperforate center portion 44.

The apparatus also includes imperforate housings 48 of channel-shaped section adapted to cover certain portions of said slots 46 and to expose other portions of said slots 46 to thwart passage of air streams from certain nozzles while permitting free passage of air streams to the path of glass sheet travel from certain other nozzles in said certain rows in the upstream portion of the quenching station 22 that face the transverse side portions of glass sheets moving through the upstream portion of the quenching station 22. An actuator is provided to move the imperforate housings 48, such as a crank 50 provided for each of the baffle means. However, it is possible to have a single crank or actuator 50 capable of moving all of the imperforate housings 48 for both the upper baffle means 40 and the lower baffle means 42 in unison.

Figure 2:
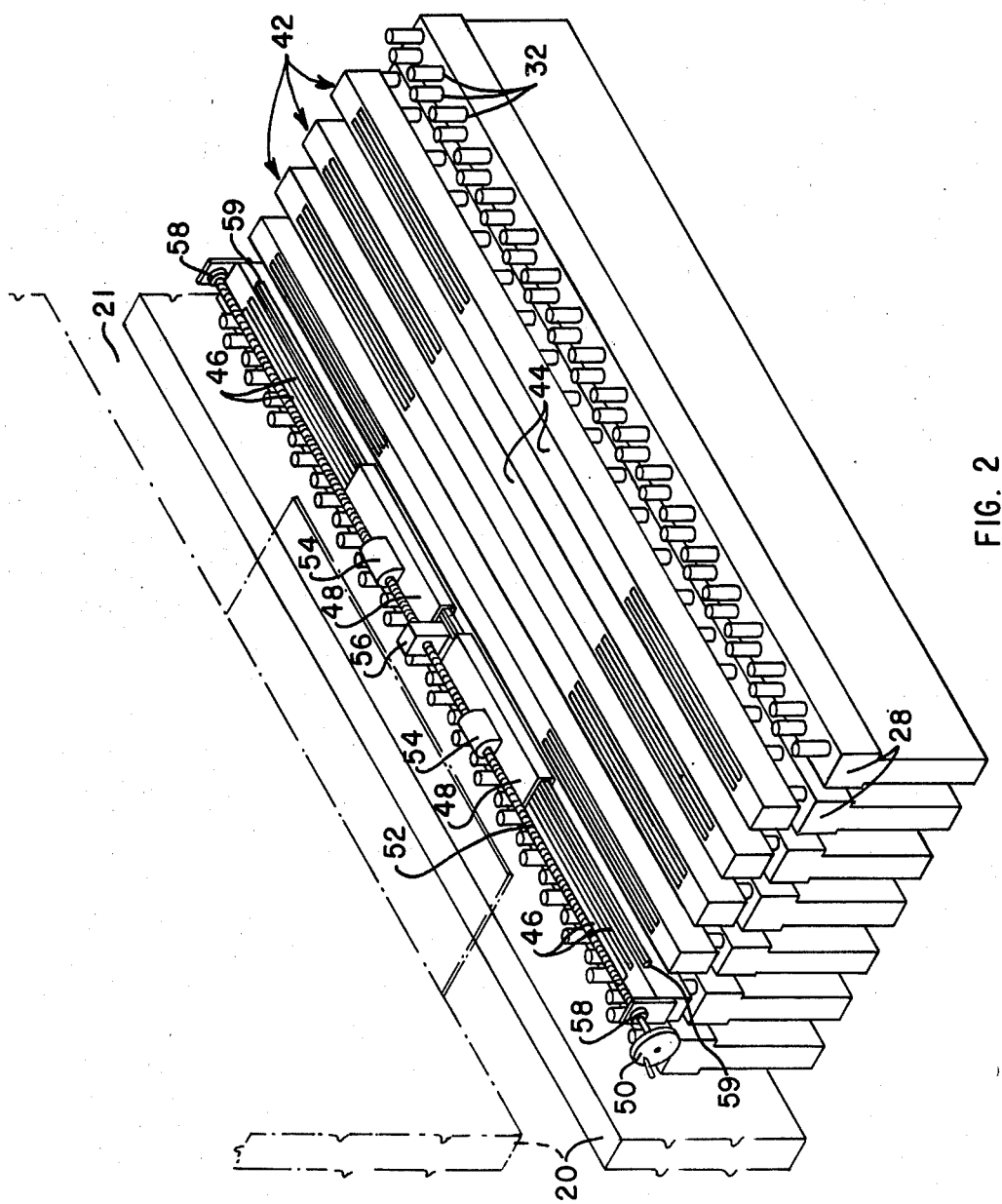
FIG. 2 is an isometric view looking down upon an area 2—2 that includes a portion of a lower set of nozzle boxes that are partially covered according to the modification of the apparatus depicted in FIG. 1.

A preferred embodiment of baffle means 40 or 42 comprises an elongated rod 52 that is provided for each baffle means. Each rod 52 is externally threaded and extends through and meshes with a pair of internally threaded sleeve housings 54 (see FIG. 2) on either transverse side of a centrally disposed rod support member 56 for each elongated rod 52. Each rod 52 is supported near its ends in end support housings 58 for each rod. Symmetrical portions of the rod 52 on either side of the centrally disposed rod support member 56 are externally threaded in opposite directions. The rod 52 is fixed for rotation with the crank 50 and the internally threaded sleeve housings 54 are fixed to the imperforate housings 48 of channel shaped section designed to slide in directions transverse to the path of travel along horizontal transversely extending tracks 59 in horizontal planes adjacent the elongated slots 46. Rotation of the crank or cranks 50 adjusts the transverse positions of the imperforate housings 48 relative to the elongated slots 46, thereby controlling the effective width of the imperforate central portion of the baffle means 40 or 42. Adjustment is made depending on the width of glass sheets undergoing treatment as will be described later.

A typical apparatus conforming to the present invention has two inch (5.08 centimeter) diameter rolls spaced six inches (15.24 centimeters) center to center along the length of the quenching station 22. Twenty upper and twenty lower nozzle boxes 27 and 28 are each provided with two offset rows of nozzles extending approximately four inches (10.16 centimeters) from the wall of the corresponding nozzle box 27 or 28. The nozzles in each row are mounted on 1.5 inch (3.81 centimeter) centers with the nozzles in one row staggered midway of the nozzles in the other row for each nozzle box. The nozzle boxes are approximately 3.75 inches (9.53 centimeters) wide parallel to the path of glass sheet travel and adjacent pairs of upper and lower nozzle boxes are located in vertical planes spaced midway between adjacent conveyor rolls 23. The lower ends of the upper nozzles 30 terminate in an upper horizontal plane approximately four inches (10.16 centimeters) above the horizontal plane of support defined by the conveyor rolls 23 and the upper ends of the lower nozzles 32 terminate in a lower horizontal plane approximately 8.5 inches (21.59 centimeters) below the upper horizontal plane.

In the typical apparatus, the imperforate central portions 44 of the baffle means 40 and 42 are 36 inches (91.44 centimeters) wide arranged symmetrically with respect to a vertical plane intersecting the longitudinal center line of the path of glass sheet travel defined by conveyor rolls 23. A pair of elongated slots 46 extends in transversely symmetrical arrangement in each direction from each imperforate central portion 44 for alignment with the pair of rows of nozzles 30 or 32 extending from each nozzle box 27 or 28. The channel shaped imperforate housings 48 move in opposite transverse directions to shield portions of the elongated slots 46 from their ends closest to the longitudinal center line toward the transverse sides of the apparatus, thereby increasing the effective width of the imperforate central portion 44 of the baffle means 40 and 42 when the housings 48 move transversely outward and reduce the effective width of the imperforate central portion 44 when they move transversely toward one another. This apparatus embodiment enables the effective width of the imperforate central portions 44 to be adjusted from a minimum of 36 inches (91.44 centimeters) to a maximum approximately double said minimum. The specific embodiment just described can be adapted to treat glass sheets ranging in width from approximately 40 inches (101.6 centimeters) to approximately 80 inches (203.2 centimeters) as will be understood from a description of operating conditions that follows.

Operating Conditions

Figure 7:
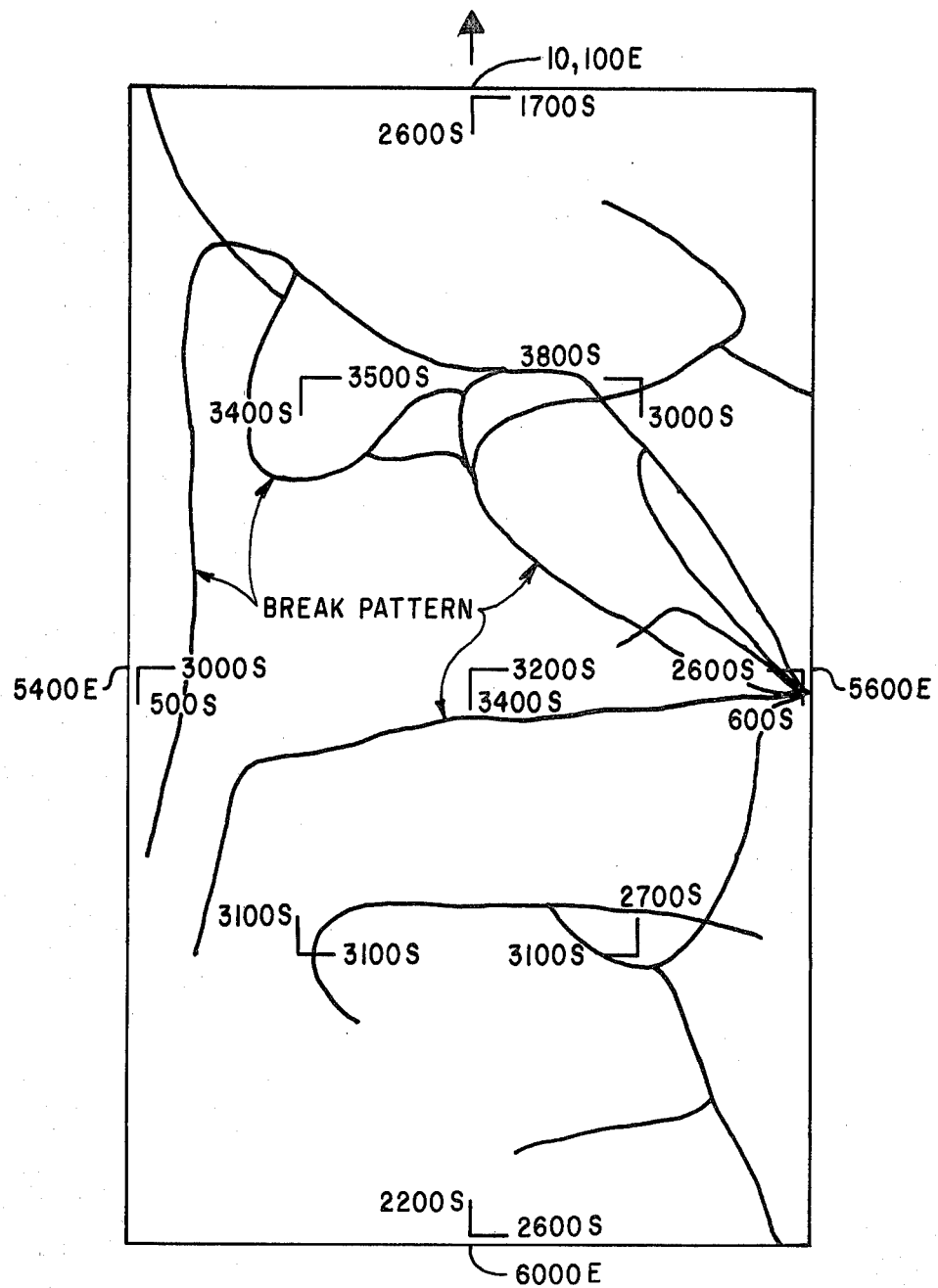
FIG. 7 is a view similar to that of FIGS. 5 and 6, showing a sheet treated in a manner different from the present invention and the resulting unacceptable break pattern and residual stress distribution.

The quenching apparatus of the present invention was originally tried without any baffle means interposed between any of the nozzles and the major glass surfaces along the entire length of the quenching apparatus. However, panels of glass sheets so treated developed break patterns having islands which permitted portions of the glass to fall away from the marginal edge portions which were installed in an installation frame. Glass test panels heated to a temperature in the range of 1160° to 1280° F. (627° to 693° C.) and then cooled at a "natural" rate of cooling without any blasts of air through the quenching nozzles broke into many pieces including areas discrete from the edge portion supported in an installation frame. Furthermore, glass test panels subjected to natural cooling warped. A typical unacceptable break pattern resulting from this process is seen in FIG. 7.

In another series of tests, test panels were heated as in the previous group and a series of upper baffles and a series of lower baffles were arranged to face the side edge portions of the moving glass sheets. Downstream of a portion of a quenching station in which the major surfaces were subjected to force cooling over their entire major surfaces, these latter panels were fully exposed on their transverse central portions only to additional force cooling while the cooling rates along the side edges were inhibited. Such panels broke into separate fragments during their processing and could not be used as installed windows.

Another group of test panels was treated by first heating each panel in a manner similar to the previous group of panels followed by forced cooling over the entire major surfaces of the panels followed by further cooling with the transverse center portion only facing upper and lower baffles while the side portions of the major surfaces were fully exposed to additional forced cooling. Glass breakage developed during the subsequent cooling, handling and storage of test panels in this group.

The only arrangements that produced panels having acceptable break patterns prior to the present invention were those reported in U.S. Pat. No. 4,236,909 where the glass sheets, after passing between nozzles that force cooled the glass, were then conveyed between baffles that inhibited force cooling of the central portion of the glass while permitting some preferential cooling along the side edge surfaces of the moving glass sheets. However, this treatment was limited to developing average residual surface compression stresses on the order of 2000 pounds per square inch. The requirement for higher compression surface stresses of Federal Specifications DD-G-1403B made it necessary to convert the operation of this latter patent to the method conforming to that of the present invention in which the side edge portions only of the moving glass sheets are force cooled at a greater rate of cooling than the intermediate area of the glass sheets followed by force cooling the entire glass sheet over the entire surface area at a rate and for a sufficient time to insure an average surface compression stress not less than 3500 pounds per square inch (246 kilograms per square centimeter) nor greater than 10,000 pounds per square inch (703 kilograms per square centimeter) and an average residual edge compression stress that is not less than 5500 pounds per square inch (387 kilograms per square centimeter).

Acceptable break patterns were obtained using baffle means covering the central portions slightly wider and extending beyond the side edges of treated glass sheets over the last eleven rows of upper nozzles and the last ten rows of lower nozzles. However, in order to fabricate glass sheets with acceptable break patterns using this arrangement, it was necessary to limit the air pressure to 0.13 inch (3.3 millimeter) water column applied against the upper major surface and 0.35 inch (8.9 millimeter) water column applied against the lower major glass sheet surface when the nozzle ends provided spaces of 2 to 2⅛ inches (5.1 to 5.4 centimeters) from the glass sheets. However, the residual surface compression of glass sheets produced in this manner was insufficient to meet the present requirements and the operating conditions had to be changed to conform to the present invention.

In operating apparatus according to the present invention, the glass sheets to be heat strengthened are fed to the conveyor at a minimum spacing of 6 inches (15 centimeters) along the path of travel. The imperforate housings 48 in the upstream portion of the quenching station 22 are adjusted to transverse positions to coordinate the width of the adjustable imperforate central portions 44 of the upper baffle means 40 and of the lower baffle means 42 to transverse positions relative to the width of glass sheets undergoing quenching so that the elongated slots 46 are shielded to transverse positions slightly inboard of the side edges of glass sheets conveyed through the quenching station 22. The number of upper and lower baffle means included may be modified as desired and generally is more for longer sheets treated and less for shorter sheets treated, the length being measured in the direction of the path of travel. Generally, three pairs of upper and lower opposed baffle means are used for sheets 40 inches (101.6 centimeters) long and five pairs for sheets 72 inches (183 centimeters) long in the direction of the path of travel.

In a specific embodiment of the present invention provided with twenty upper nozzle boxes 27 and twenty opposite lower nozzle boxes 28, three to five upper nozzle boxes and three to five opposite lower nozzle boxes are usually provided with upper baffle means 40 and lower baffle means 42, respectively. The upstream opposing pair of upper nozzle box 27 and lower nozzle box 28 is disconnected from a pressurized source of cold quenching medium so that a glass sheet that arrives at the furnace exit at an elevated temperature sufficient for tempering is cooled naturally for a period of one to three seconds upon leaving the tunnel-like furnace 20 until the sheet reaches a position between rows of nozzles whose centrally disposed nozzles are shielded and whose flanking nozzles are uncovered.

The glass sheet traverses the portion of the quenching station that contains three to five pairs of upper and lower baffle means of properly adjusted width in four to seven seconds. During this time cold quenching medium force cools the opposite side edge portions of the glass sheet while the intermediate area of the glass sheet moving between the baffle means is cooled at a lesser rate. By the time the glass sheet reaches the end of the upstream portion of the quenching station 22 provided with baffle means 40 and 42, the glass sheet has cooled but is still sufficiently above the strain point of the glass to impart permanent stresses by further cooling. At this point the glass has begun to develop cooler side edge portions and cooler leading and trailing edge portions. The glass continues to move between the additional upper and lower nozzle boxes which are free of baffle means so that the cooling of the moving glass sheets continues throughout its entire upper and lower major surfaces. The number of nozzle boxes beyond those fitted with the upper and lower baffle means that is provided with cold quenching medium under pressure depends upon the desired residual surface and edge compression stresses to be imparted to the glass sheets.

It is well known that when glass sheets are conveyed between opposite blasts of quenching medium, warpage may occur. This happens especially when glass sheets are conveyed with their lower major surfaces conveyed over a series of rotating conveyor rolls and their upper major surfaces are exposed to air. It is conventional to control the comparative flow of quenching medium against the top and bottom surfaces to reduce this glass sheet warpage. The present invention has an auxiliary feature of combining the basic principle of this invention with a novel technique for controlling the amount of difference of total flow of quenching medium against the opposite major surfaces which provides another parameter for use in controlling glass sheet warpage. In operating the quenching apparatus of the present invention, the same number or a different number of upper and lower nozzle boxes can be used to supply quenching medium toward the opposite major surfaces of the moving glass sheets to control the warping of the glass sheets, particularly when the pressure of the air applied against the upper and lower major surfaces differ.

Test Procedures

Figure 5:
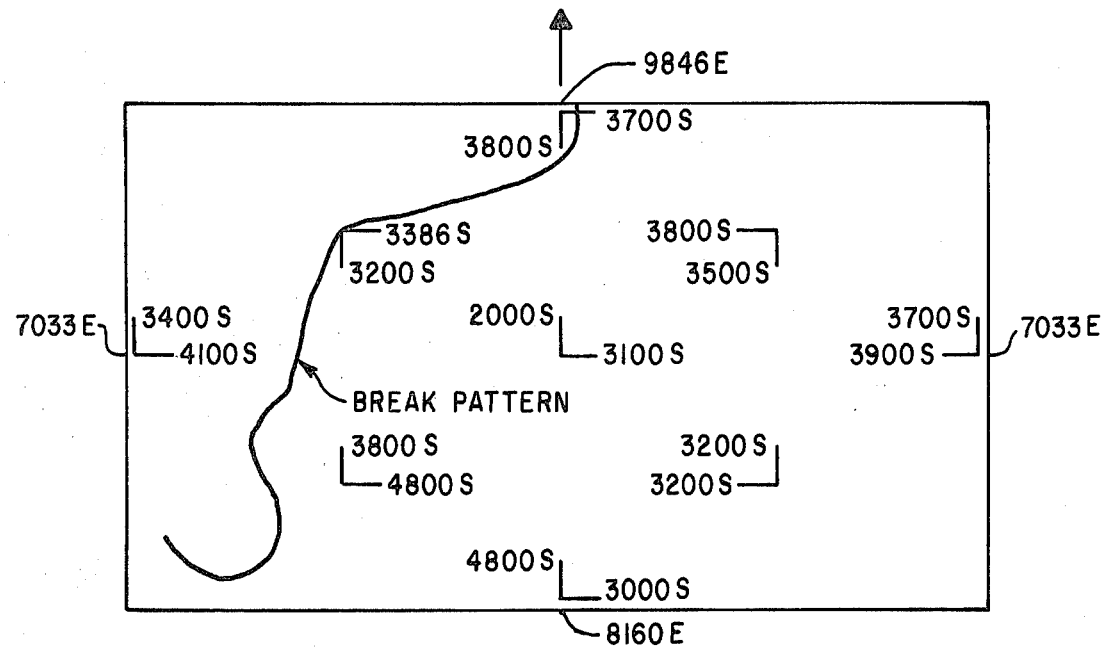
FIG. 5 is a plan view of a heat-strengthened glass sheet that was moved in the direction of an upwardly pointed arrow during its heat strengthening treatment, showing its residual surface compressive stress readings in mutually perpendicular directions parallel to the sheet edges at nine measuring points and residual edge compression stress readings at mid-points along its four edges, and an acceptable break pattern that forms after the glass sheet is struck with a punch while subjected to differential heating between its geometric center and the periphery of the glass sheet and the glass sheet secured around its entire marginal portion within a frame that simulates a glazing condition in a building.
Figure 6:
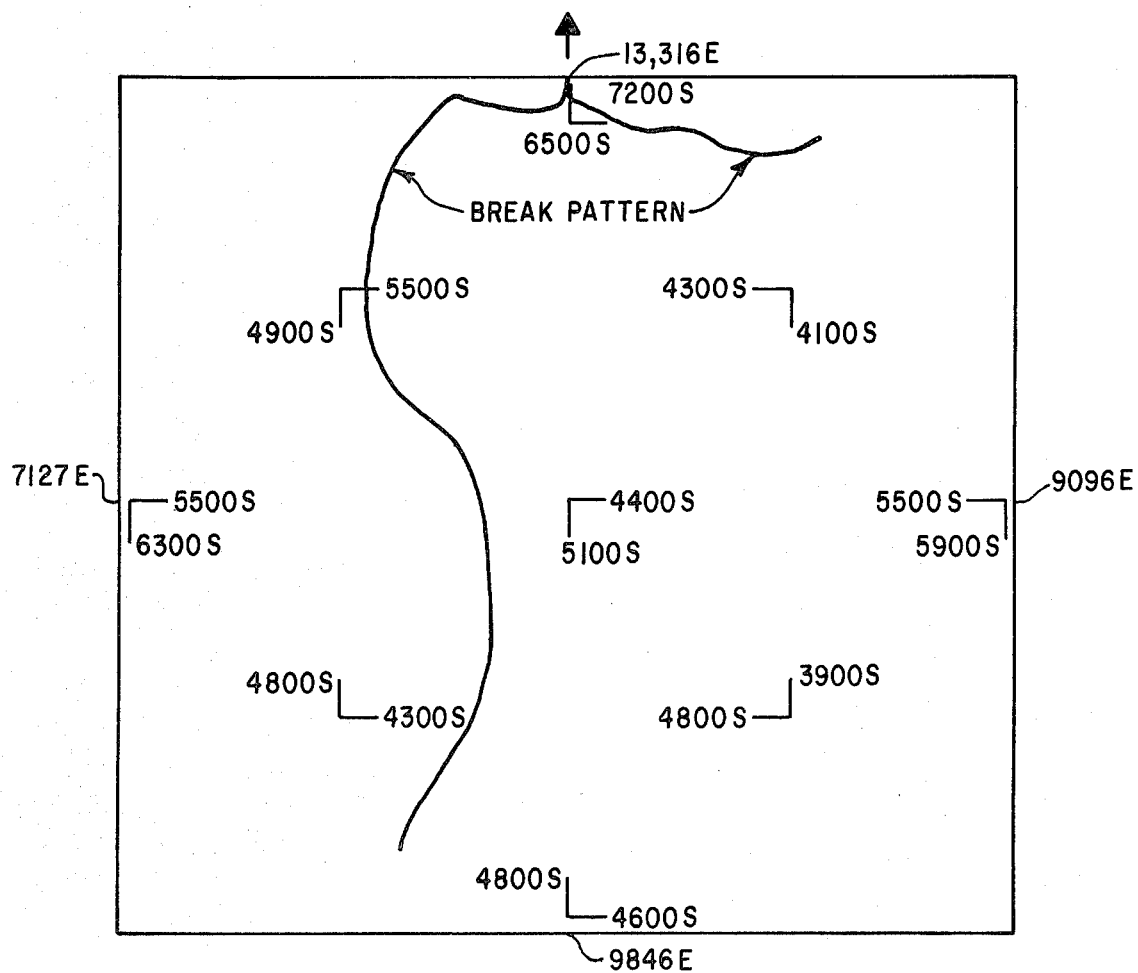
FIG. 6 is a view similar to FIG. 5 of another glass sheet so treated.

Residual edge compression stress measurements were made perpendicular to the edge surfaces at the center of each of the sides of each heat-strengthened glass sheet tested, using a quartz wedge in the usual manner. Residual surface compression stress measurements were made in mutually perpendicular directions at nine locations on the major surface of each glass sheet tested. One test location was at the geometric center of the sheet, four more test locations were at the mid-point between the geometric center and each corner of each sheet, and four more test locations were at approximately one-half inch (1.27 centimeters) to 1½ inches (3.81 centimeters) inward of the mid-portion of each side edge. A differential surface refractometer described in ISA Transactions, Volume 4, No. 4, October 1965 was used to measure the residual surface compression stresses in directions parallel to the opposite side edges of the sheet tested. In FIGS. 5, 6 and 7, the values of residual compression stress readings are shown in the locations where stresses were measured. In these drawings, the numbers represent pounds per square inch of residual compression stress, S indicates surface compression stress and E indicates edge compression stress.

To simulate actual surface conditions experienced in use, the geometrical center of each sheet tested was heated to a temperature of about 60° F. (33° C.) hotter than the edge so that a thermal gradient approximating severe conditions expected for the window in use in a building was obtained during the test program. Many of the test performed on sheets treated in a manner different from the treatment of the present invention resulted in sheets breaking before a break could be induced artificially by applying a metal punch in a manner to be described in more detail later.

EXAMPLE I

Seven glass sheets were heated to a temperature sufficient for tempering using a roller hearth furnace and a quenching station arranged as in the described embodiment. The glass sheets 225 mils (nominally 6 millimeters) thick were heated to have a temperature of 1230° to 1250° F. (666° to 677° C.) when they left the furnace. Glass sheets 68⅜ inches (174 centimeters) wide and either 40¼ inches (102 centimeters) or 72 inches (183 centimeters) long were treated in apparatus having twenty upper and twenty lower nozzle boxes.

For each glass sheet treated, eighteen residual surface compression stress measurements were made at the nine locations indicated previously and averaged to obtain an average residual compression stress value. Also, four residual edge compression stress readings were taken at the four locations previously described and the average of these four readings was computed and reported as average residual edge compression stress. These average residual compression stress values were compared with the federal specifications. Table I indicates the setup of the quenching station including the pressure in the nozzle boxes in water column and the average surface and edge compression stresses that were developed during the operation. Results are reported in English units because these units are specified in the federal specifications.

In performing these experiments, the second to the sixth upper and lower nozzle boxes were covered with baffle means which extended across the middle 60 inches (152 centimeters) wide for the sheets sheets conveyed with their 68⅜ inch (174 centimeter) dimension oriented transversely to by their leading edges. Different pressures were applied as reported to the top and bottom nozzle boxes in order to control the warpage of the glass sheets, as it is well known that glass sheet warp can be controlled by modifying differential cooling patterns.

All of the glass sheets, after they were heat strengthened, were subjected to a break test while installed within a mounting frame by heating the geometric center of the glass sheet until the center developed a temperature 60° F. (33.3° C.) higher than the margin of the sheet. A sharp spring-loaded center punch was applied to the approximate center of a side portion of the sheet approximately ½ inch (1.27 centimeters) to one inch (2.54 centimeters) inward of an edge of the sheet. The settings of the apparatus for each test and the observed results are reported in TABLE I. Typical acceptable break patterns resulting from two break tests and stress measurements measured in two of the test sheets reported in TABLE I are shown in FIGS. 5 and 6.

It is noted that certain shorter glass sheets tested had poor break patterns when attempting to obtain average residual surface compression stresses greater than 4300 pounds per square inch (302 kilograms per square centimeter (or 22 percent greater than needed to meet the minimum requirements for the federal specifications), while one shorter and three of three longer glass sheets developed acceptable break patterns, the shorter sheet at a residual average surface compression stress of 3577 pounds per square inch (251 kilograms per square centimeter), which exceeded the minimum requirement of the federal specification and the longer sheets developed average residual surface compression stresses as high as 5228 pounds per square inch (368 kilograms per square centimeter) with an acceptable break pattern (or 50 percent more than the minimum requirements of the federal specification).

The experiments performed to provide the data for TABLE I were with glass sheets coated with an opaque frit. Experience has shown that uncoated glass sheets are easier to heat strengthen to a greater average residual compression stress accompanied by an acceptable break pattern than coated glass sheets.

TABLE I

STUDY ON CONTROLLING STRESS PATTERN IN HEAT-STRENGTHENED COATED GLASS

Baffles Applied to 60 Inch (152 cm) Wide Center Portions of Nozzle Boxes 2 to 6

| Size Orientation, Coating State | Nozzle Box Pressure Top/Bottom (inches of water column) | Nozzle Boxes Pressurized Top/Bottom | Natural Cooling (Sec.) | Exit Glass Temp. (°F.) | Average Residual Stress | Type of Break Pattern |
|---|---|---|---|---|---|---|
| I LC | .74 | 2 to 13 | 1.4 | 1250 | 3577 S | Good |
|  | 1.14 | 2 to 12 |  |  | 8020 E | (FIG. 5) |
| II WC | 1.18 | 2 to 28 | 1.4 | 1230 | 4800 S | Good |
|  | .86 | 2 to 27 |  |  | 8600 E |  |
| I LC | 1.18 | 2 to 28 | 1.4 | 1240 | 5564 S | Poor |
|  | .86 | 2 to 27 |  |  | 8060 E |  |
| II WC | 1.32 | 2 to 28 | 1.4 | 1245 | 5228 S | Good |
|  | 1.08 | 2 to 27 |  |  | 9846 E | (FIG. 6) |
| I LC | 1.32 | 2 to 28 | 1.4 | 1250 | 5444 S | Poor |
|  | 1.08 | 2 to 27 |  |  | 9870 E |  |
| I LC | .58 | 2 to 25 | 1.4 | 1245 | 4322 S | Poor |
|  | 1.06 | 2 to 24 |  |  | 7924 E |  |
| II WC | .58 | 2 to 25 | 1.4 | 1235 | 4588 S | Good |
|  | 1.06 | 2 to 24 |  |  | 8580 E |  |

Size I is 68⅞ inches (174 centimeters) by 40¼ inches (102 centimeters).
Size II is 68⅞ inches (174 centimeters) by 72 inches (183 centimeters).
L means oriented with length dimension as leading edge.
W means oriented with width dimension as leading edge.
C means coated.
U means uncoated.
S means average residual surface compression stress in psi.
E means average residual edge compression stress in psi.

The results from TABLE I show some difficulty in obtaining a combination of good break pattern with a high residual surface compression stress in sheets of Size I. Accordingly, the controls on the apparatus were modified and satisfactory results combining higher residual surface compression stresses and acceptable break patterns were obtained after the changes were made to those enumerated in TABLE II. The additional data recited hereafter are examples of adjustments made for mass production purposes to obtain a satisfactory yield of sheets that meet the federal specifications for stress patterns and also have adequate break patterns when subjected to the spring-loaded center punch fracture test described previously.

EXAMPLE II

The apparatus used to obtain the data reported in TABLE I was modified as indicated in TABLE II to develop a better technique for heat-strengthening glass sheets. The various treatments for coated and uncoated glass sheets of Size I and the results obtained are reported in TABLE II.

TABLE II

FURTHER STUDY ON OBTAINING ACCEPTABLE BREAK PATTERN IN HEAT-STRENGTHENED GLASS

| Size, Orientation, Coated State | Nozzle Box Pressure Top/Bottom (inches of water column) | Nozzle Boxes Pressurized Top/Bottom | Width of Baffle (in.) | Natural Cooling (Sec.) | Exit Glass Temp. (°F.) | Average Residual Stress | Type of Break Pattern |
|---|---|---|---|---|---|---|---|
| I WU | .84 | 2 to 13 | 36 | 1.5 | 1222 | 4378 S | Good |
|  | 1.0 | 2 to 12 |  |  |  | 13,190 E |  |
| I WC | .84 | 2 to 13 | 36 | 1.5 | 1218 | 4433 S | Good |
|  | 1.0 | 2 to 12 |  |  |  | 10,736 E |  |
| I LC | 1.10 | 2 to 13 | 60 | 1.5 | 1270 | 4380 S | Good |
|  | 1.08 | 2 to 12 |  |  |  | 10,500 E |  |
| I LU | .92 | 2 to 13 | 62 | 1.5 | 1190 | 4806 S | Good |
|  | 1.2 | 2 to 12 |  |  |  | 9284 E |  |

(Note: Size and Letters have the same meaning as in Table I.)

TABLE II indicates that the apparatus had been adjusted to improve the break patterns obtained with Size I sheets regardless of the sheet orientation during treatment compared to the experiments reported in TABLE I. Note that good break patterns resulted with higher residual compression stresses than the lowest stress pattern reported for a poor break pattern in TABLE I. After parameters were set for different sizes of glass sheets, the apparatus modified according to the present invention operated acceptably under mass production conditions.

The average residual edge compression stresses in the leading and trailing edges of glass sheets moved in a series complied with the requirements of the federal specifications mentioned hereinbefore provided the sheets were separated from one another a sufficient distance so that the heat radiated from one sheet does not interfere with the cooling of the leading or trailing edge of the following sheet. A suitable minimum distance between adjacent sheets in a series is approximately six inches (fifteen centimeters).

The form of invention shown and described in this disclosure represents an illustrative preferred embodiment and modifications thereof. It is understood that various changes may be made without departing from the gist of the invention as defined in the claimed subject matter which follows, so long as the glass sheets undergoing treatment have their main portion cooled at a slower and more uniform rate than the leading edge portion, the trailing edge portion and both side edge portions before overall forced cooling of the glass sheet begins by applying cold streams of quenching medium while the glass is at a temperature above the strain point.

I claim:

1. A method of fabricating a heat-strengthened glass sheet having a break pattern on fracture that permits the fractured glass sheet to be retained within an installation frame comprising heating said glass sheet to a temperature sufficient for tempering by moving said glass sheet through a heating area, force cooling the lateral side portions of said moving glass sheet while cooling the area of said moving glass sheet intermediate said lateral side portions at a lesser rate of cooling to establish a temperature gradient in the sheet transverse to its direction of movement comprising relatively cold lateral side portions and a relatively hot intermediate area, and, before the temperature of the intermediate area of said moving glass sheet reaches the strain point, applying streams of cold quenching medium to the entire major surfaces of said moving glass sheet at a flow rate sufficient to provide said heat-strengthened glass sheet with said desired break pattern.

2. A method as in claim 1, wherein said glass sheet is cooled naturally for approximately one to three seconds as it moves from said heating area to the location where its lateral side portions only are exposed to said streams of cold quenching medium.

3. A method as in claim 1 or claim 2, wherein said glass sheet is one of a series of glass sheets moved in longitudinally spaced relation at such a longitudinal distance between adjacent of said glass sheets that the leading and trailing edge portions of said sheets are able to develop residual edge compression stresses sufficient to insure said desired break pattern.

4. A method as in claim 3, wherein said glass sheets are moved in an essentially horizontal path and supported in an essentially horizontal plane by moving said sheets between opposed arrays of upper and lower nozzles applying quenching medium toward the upper and lower major surfaces of the moving glass sheets, interposing baffle means between certain of said upper and lower nozzles and the intermediate area of said moving glass sheets to force cool said lateral side portions relative to said intermediate area in the early stage of said cooling and applying quenching medium from unshielded upper and lower nozzles facing the entire width of said upper and lower major surfaces from a time when each moving glass sheet in turn is above the strain point of the glass to a time when said moving glass sheet cools to below its strain point.

5. A method as in claim 4, wherein the opposite major surfaces of said glass sheets are directly exposed to an equal number of streams of quenching medium on each major surface at opposing flow rates that are adjusted relative to one another to minimize warping of said moving glass sheets.

6. A method as in claim 4, wherein the opposite major surfaces of said moving glass sheets are exposed to a different number of streams of quenching medium, the difference in number of streams applied to the opposite major surface being coordinated with the flow of quenching medium against the opposite major surfaces to minimize warpage of said moving glass sheets.

7. Apparatus for heat strengthening glass sheets comprising:
a furnace;
a quenching station mounted adjacent an exit end of the furnace wherein said quenching station includes:
first means mounted on each side of the path of travel for directing tempering medium toward the path of travel;
baffle means mounted between said first directing means and adjacent side of the path of travel, said baffle means including a plate comprising:
an imperforate portion facing only a center portion of the path of travel to restrict flow of tempering medium toward the center portion of the path, and
an apertured portion having apertures beyond each transverse end of said imperforate portion facing lateral side portions of the path of travel to permit flow of quenching medium through said apertures toward the lateral side portions only of the path of travel to establish a temperature gradient in the sheet moving between said first directing means transverse to the path of travel;
second means mounted on each side of the path of travel downstream of said first directing means for directing quenching medium toward the path of travel between said second directing means to provide heat strengthened glass with a predetermined break pattern; and
means for moving a glass sheet along a path of travel through the furnace and said quenching station.

8. Apparatus as in claim 7, wherein said moving means moves the glass sheet along a generally horizontal path.

9. Apparatus as in claim 8, wherein said first directing means includes upper and lower sets of nozzles.

10. Apparatus as in claim 9 wherein said apertures include elongated slots, and said baffle means further comprises:
a baffle member; and
means for mounting said baffle member to selectively move over selected portions of said slots to decrease slot area to restrict flow of tempering medium toward the path of travel.

11. Apparatus as in claim 10 wherein
said moving means moves said baffle member from a first position over said imperforate portion into one of a selected number of positions over said slots along a path transverse to the path of travel.

12. The apparatus as set forth in claim 11, wherein said baffle member includes an imperforate housing.

13. Apparatus as in claim 12, wherein said imperforate housing is one of a pair of said housings, and said moving means moves said pair of housings relative to one another.

14. Apparatus for establishing a desired temperature gradient in glass sheets comprising:
a furnace;
a quenching station mounted adjacent an exit end of the furnace wherein said quenching station includes:
means mounted on each side of the path of travel for directing tempering medium toward the path of travel, baffle means mounted between said directing means and adjacent side of the path of travel, said baffle means including a plate comprising:

an imperforate portion facing only a center portion of the path of travel to restrict flow of tempering medium toward the center portion of the path; and an apertured portion having apertures beyond each transverse end of said imperforate portion facing lateral side portions of the path of travel to permit flow of quenching medium through said apertures toward the lateral side portions only of the path of travel to establish a temperature gradient in the sheet moving between said directing means transverse to the path of travel; and means for moving a glass sheet along a path of travel through the furnace and said quenching station.

15. Apparatus as in claim 14, wherein said moving means moves the glass sheet along a generally horizontal path.

16. Apparatus as in claim 15 wherein said directing means includes upper and lower sets of nozzles.

17. Apparatus as in claim 16, wherein said apertures include elongated slots and said baffle means further comprises:

a baffle member; and means for mounting said baffle member to selectively move over portions of said slots to decrease slot area to restrict flow of tempering medium toward the path of travel.

18. Apparatus as in claim 17 wherein said moving means moves said baffle member from a first position over said imperforate portion into one of a selected number of positions over said slots along a path transverse to the path of travel.

19. The apparatus as set forth in claim 18, wherein said baffle member includes an imperforate housing.

20. Apparatus as in claim 19, wherein said imperforate housing is one of a pair of said housings, and said moving means moves said pair of housings relative to one another.

* * * * *